United States Patent Office 3,349,085
Patented Oct. 24, 1967

3,349,085
ACETALS AND KETALS OF 6-ALKYL-16,17-DIHYDROXYPROGESTERONE AND INTERMEDIATES THEREFOR
Josef Fried, Princeton, N.J., assignor to E. R. Squibb & Sons, Inc., New York, N.Y., a corporation of Delaware
No Drawing. Filed July 30, 1959, Ser. No. 830,467
11 Claims. (Cl. 260—239.55)

This invention relates to, and has for its object the provisions of, a method of preparing physiologically active steroids, and to the physiologically active steroids produced thereby.

The steroids of this invention include the 16α,17α-acetal and ketal derivatives of 6-alkyl-16α,17α-dihydroxyprogesterones and ketones or aldehydes, and more particularly steroids of the general formula

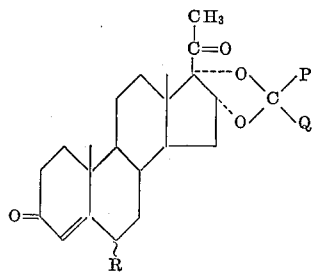

wherein R is lower alkyl (preferably methyl) in either the alpha or beta position; and P and Q are hydrogen, lower alkyl, halogenated lower alkyl, monocyclic cycloalkyl, monocyclic aryl, monocyclic aryl lower alkyl, monocyclic heterocyclic, or monocyclic heterocyclic alkyl; or together with the carbon atom to which they are joined P and Q is cycloalkyl or monocyclic heterocyclic.

The compounds of this invention are prepared, in accordance with the process of this invention, by interacting a steroid reactant of the general formula

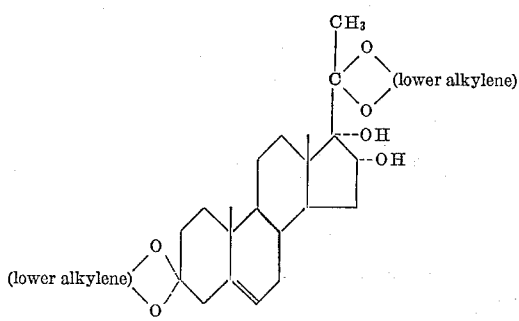

with a peracid, such as perbenzoic acid, monoperphthalic acid and peracetic acid, to yield the new 5α,6α-epoxy derivatives of this invention having the formula

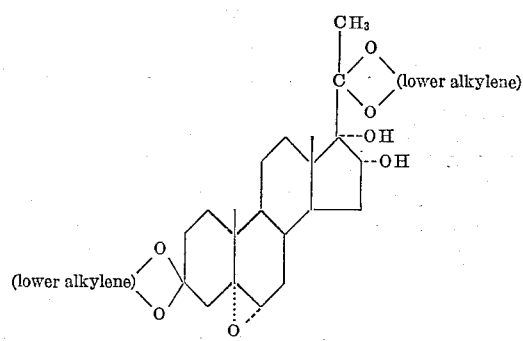

The 5α,6α-epoxy derivatives are then treated with a Grignard reagent, such as a lower alkyl magnesium bromide (e.g. methyl magnesium bromide and ethyl magnesium bromide) or wtih a lithium lower alkyl (e.g. lithium methyl) to yield the corresponding new 6β-(lower alkyl)-5α-hydroxy derivatives of this invention having the formula

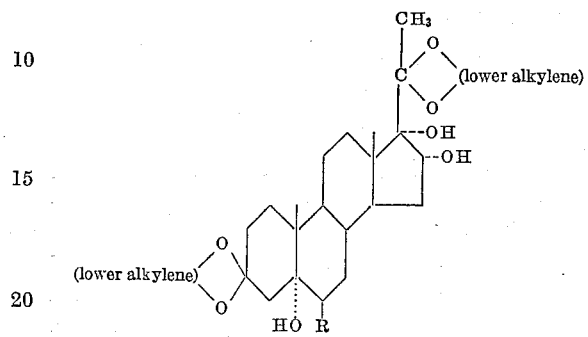

wherein R is as hereinbefore defined. The reaction is preferably conducted in an organic solvent system for both the steroid and Grignard reagent at any normal temperature, such as ambient temperature.

The ketal groups in the 3 and 20 positions are then hydrolyzed by treatment with an acid, such as a mineral acid (e.g. sulfuric and perchloric acid) to yield the corresponding 6β-(lower alkyl)pregnane-5α,16α,17α-triol-3,20-diones of this invention having the formula

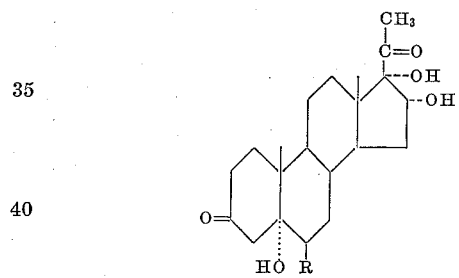

wherein R is as hereinbefore defined. The reaction is preferably conducted in an organic solvent for the steroid. If an aldehyde or ketone is chosen as the solvent, then simultaneous hydrolysis and acetalization or ketalization occurs, thereby forming compounds having the formula

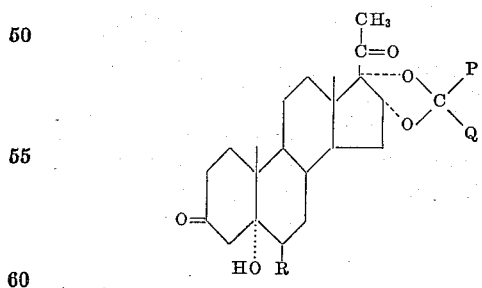

wherein P, Q and R are as hereinbefore defined. If an inert organic solvent, such as a lower alkanol (e.g. methanol) is employed in the original hydrolysis, then the resulting 3,20-diketo steroids can be acetalized or ketalized by treating with the desired aldehyde or ketone, preferably in the presence of an acid catalyst (e.g. perchloric acid, p-toluenesulfonic acid and hydrochloric acid), neutralizing the acid and recovering the acetal or ketal derivative formed.

In either event, among the suitable aldehydes and ketones may be mentioned aldehydes such as paraldehyde, propanal, chloral hydrate, trifluoroacetaldehyde hemiacetal, heptafluorobutanal ethyl hemiacetal and hexanal; di(lower alkyl) ketones, such as acetone, diethylketone, dibutylketone, methylethylketone, and methylisobutylketone; halogenated di(lower alkyl)ketones, such as 1,1,1-trifluoro acetone; mono and dicycloalkyl ketones, such as cyclohexylmethyl ketone and dicyclopropyl ketone; cycloalkanones, such as cyclobutanone, cyclopentanone, cyclohexanone, suberone, and cyclodexanone; monocyclic aromatic aldehydes such as benzaldehyde, halobenzaldehydes (e.g. p-chlorobenzaldehyde and p-fluorobenzaldehyde), lower alkoxy benzaldehydes (e.g. o-anisaldehyde), di(lower alkoxy)benzaldehydes (e.g. veratraldehyde), hydroxybenzaldehydes (e.g. salicyaldehyde), dihydroxybenzaldehydes (e.g. resorcylaldehyde), lower alkyl benzaldehydes (e.g. m-tolualdehyde and p-ethylbenzaldehyde), di(lower alkyl)benzaldehydes (e.g. o,p-dimethylbenzaldehyde), nitrobenzaldehydes, acylamidobenzaldehydes (e.g. N-acetyl-anthranilaldehyde), and cyanobenzaldehydes; monocyclic aromatic lower alkanals, such as phenylacetaldehyde, α-phenylpropionaldehyde, β-phenylpropionaldehyde, γ-phenylbutryaldehyde, and aromatically-substituted halo, lower alkoxy, hydroxy, lower alkyl, nitro, acylamido and cyano derivatives thereof; monocyclic heterocyclic aldehydes, such as picolinaldehydes, furfural, thiophene carbonals, and halo, lower alkoxy, hydroxy, lower alkyl, nitro, and cyano derivatives thereof; and monocyclic heterocyclic lower alkanals, monocyclic aromatic ketones, such as acetophenone, propiophenone, butyrophenone, valerophenone, isocaprophenone, halophenyl lower alkyl ketones (e.g. p-chloroacetophenone and p-chloropropiophenone), (lower alkoxy)phenyl lower alkyl ketones (e.g. p-anisyl methyl ketone), di(lower alkoxy)phenyl lower alkyl ketones, hydroxyphenyl lower alkyl ketones, dihydroxyphenyl lower alkyl ketones (e.g. resacetophenone), (lower alkyl)phenyl lower alkyl ketones (e.g. methyl p-tolyl ketone), di(lower alkyl)phenyl lower alkyl ketones (o,p-xylyl methyl ketone), nitrophenyl lower alkyl ketones (e.g. p-nitroacetophenone) acylamidophenyl lower alkyl ketones (e.g. acetylanilines), and cyanophenyl lower alkyl ketones; benzophenone, and mono or bis substituted halo, lower alkoxy, hydroxy, lower alkyl, nitro, acylamido and cyano derivatives thereof; monocyclic aromatic lower alkanones, such as 1-phenyl-3-butanone and 1-phenyl-4-pentanone, and aromatically substituted derivatives thereof; monocyclic heterocyclic ketones, such as 2-acetylfuran, 2-benzoyl furan, and 2-acetylthiophene; monocyclic heterocyclic lower alkanones; and monocyclic heterocyclic ketones, such as alloxan.

The resulting 16,17-cyclic acetal or ketal derivative of 6β-(lower alkyl)pregnane-5α,16α,17α-triol-3,20-dione is then dehydrated by treatment with a dilute base (e.g. sodium hydroxide and sodium carbonate) in an inert solvent at ambient temperature, with a dilute acid at ambient temperature or with an acid chloride (such as SOCl₂, POCl, etc.) in a tertiary base (such as pyridine) preferably in the cold (e.g. at 0° C.), to yield the corresponding 16,17-cyclic acetal or ketal derivative of 6β-(lower alkyl)16α,17α-dihydroxyprogesterone, final products of this invention having the general formula

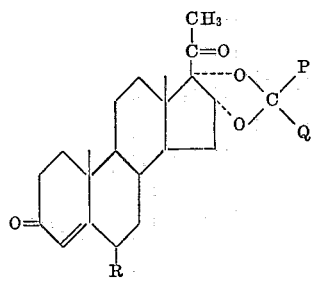

wherein P, Q and R are as hereinbefore defined.

To prepare the 6α-(lower alkyl) derivatives of this invention, the 6β-(lower alkyl) group is inverted. This inversion can be accomplished by a number of methods. In accordance with one method, the 6β-(lower alkyl) steroid is treated with hydrogen chloride in an organic medium. In accordance with another method, the 6β-(lower alkyl) steroid is first treated with pyrrolidine to yield the corresponding enamine derivative of the general formula

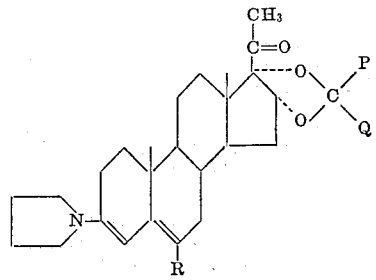

wherein P, Q and R as hereinbefore defined and the enamine is then hydrolyzed in a weakly alkaline medium as provided by an acetate buffer. In either event, the thermodynamically more stable 6α-(lower alkyl) steroid final products of this invention, having the formula

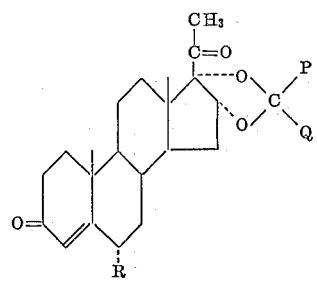

wherein P, Q and R are as hereinbefore defined, are obtained.

All the steroidal final products of this invention are physiologically active substances which possess progestational activity when administered either perorally or parenterally, and hence the compounds of this invention can be used in the treatment of such diseases and conditions as habitual or threatened abortion, amenorrhea, metropathia hemorrhagica, dysmenorrhea, inadequate corpus luteum function, and premenstrual tension, being formulated for such administration in the usual perorally or parenterally acceptable formulations. Moreover, it has been surprisingly found that the 16,17-acetonide of the 6-methyl - 16α,17α - dihydroxyprogesterone, for example, when administered perorally is many times more active a progestational agent than is the 16,17-acetonide of 16α, 17α-dihydroxyprogesterone.

The following examples illustrate the invention (all temperatures being in centigrade):

EXAMPLE 1

*5α,6α-epoxypregnane-16α,17α-diol-3,20-bisethylene ketal and 5β,6β-epoxypregnane-16α,17α-diol-3,20-bisethylene ketal*

To a solution of 4.35 grams (10 millimoles) of 16α, 17α-dihydroxyprogesterone 3,20-bisethylene ketal [prepared as described in J.A.C.S., 78, 1909, (1956)] in 100 ml. of chloroform is added at 0° over a period of ten minutes 40 ml. of a .5 N solution of monoperphthalic acid in ether. [The latter solution was prepared as described in The Journal of the American Chemical Society, vol. 77, page 3406 (1955).] The reaction mixture is allowed to remain at 0° for 16 hours following which it is poured with stirring into an ice-cold solution of 5 grams of sodium carbonate in 100 ml. of water. After separation of the layers, the chloroform solution is washed with water, dried over sodium sulfate and the solvents removed in vacuo. The residual solid consists of a mixture of the 5α,6α- and 5β,6β-epoxides. Separation of the two epoxides is achieved by recrystallization from acetone from which the α-epoxide separates first as the less soluble component. The pure α-epoxide after recrystallization from acetone has the following properties: M.P. about 260–262°, $[α]_D^{23}$ —56° (c, .62 in chlf.).

Analysis.—Calc'd for $C_{25}H_{38}O_7$: C, 66.64; H, 8.50. Found: C, 66.53; H, 8.46.

The 5α,6α β-epoxide after recrystallization from acetone has the following properties: M.P. about 175–178°, $[α]_D^{23}$ —10.1° (c, .62 in chlf.). The yield of the α-epoxide is approximately 56% of theory, that of the β-epoxide approximately 20% of theory.

In place of the perphthalic acid used in Example 1, perbenzoic acid may be used.

EXAMPLE 2

To a stirred suspension of 1.2 grams of sodium acetate in 240 ml. of chloroform is added at room temperature 12 ml. of a 40% peracetic acid solution. Four grams of 16α,17α-dihydroxyprogesterone-3,20-bisethylene ketal is then added and the mixture stirred at room temperature overnight. The reaction is terminated by the rapid addition with stirring of 150 ml. of ice-cold 1 N sodium hydroxide. The layers are separated and the chloroform phase washed again with sodium hydroxide and then with water until free from peracid, as ascertained by testing the chloroform solution with potassium iodide starch paper. The solution is then dried over sodium sulfate and the solvent removed in vacuo. The resulting residue on crystallization from acetone affords the α- and β-epoxides in yields of about 25% and 40% of theory, respectively.

EXAMPLE 3

*5α,16α,17α-trihydroxy-6β-methylpregnane 3,20-bisethylene ketal*

To a suspension of 1 g. of th 5α,6α-epoxide obtained in Example 1 in 50 ml. of dry tetrahydrofuran (freshly distilled from lithium aluminum hydrid) is added a solution of methylmagnesium bromide [prepared from 3 ml. of methyl bromide, 1.5 grams of magnesium and 60 ml. of dry ether]. The resulting mixture is stirred at room temperature for 18 hours, the clear solution cooled in an ice bath and decomposed carefully by the addition of ammonium chloride solution. More ether is then added and after separation of the layers the ether-tetrahydrofuran solution is washed with water until neutral, dried over sodium sulfate and the solvents evaporated to dryness in vacuo. The combined aqueous solutions are extracted with chloroform and the resulting chloroform extract washed with water, dried over sodium sulfate, evaporated to dryness and the dried residue combined with the above residue from the ether extract. Crystallization of this material from acetone furnishes pure 5α,16α,17α-trihydroxy-6β-methylpregnane 3,20-bisethylene ketal in about 85% yield. The compound can be obtained in two polymorphic modifications, which melt respectively at about 188–199° and 233–235°. $[α]_D^{23}$ —50° (c, .85 in chlf.)

$λ_{max.}^{Nujol}$ 2.87–2.92 mμ

(higher melting modification); 2.87 mμ (sharp, lower melting modification). The infrared spectra of the two modifications differ also in the fingerprint region.

Analysis.—Calc'd for $C_{26}H_{42}O_7$: C, 66.92; H, 9.07. Found: C, 66.96; H, 9.02.

The reaction of Example 3 can also be accomplished by substituting methyl lithium in ether for the methylmagnesium bromide used in the example.

EXAMPLE 4

*5α,16α,17α-trihydroxy-6β-ethylpregnane 3,20-bisethylene ketal*

Following the procedure of Example 3, but substituting ethylmagnesium bromide [prepared from 3 ml. of ethyl bromide, 1.5 grams of magnesium and 60 ml. of dry ether] for the methylmagnesium bromide, 5α,16α,17α-trihydroxy-6β-ethylpregnane 3,20-bisethylene ketal is obtained.

EXAMPLE 5

*5α,16α,17α-trihydroxy-6β-methylpregnane-3,20-dione*

A solution of 252 mg. of 5α,16α,17α-trihydroxy-6β-methylpregnane 3,20-bisethylene ketal and 1.2 ml. of 7.2% sulfuric acid (w./v.) in 17 ml. of methanol is heated to reflux for 15 minutes. The solution is then diluted with water and concentrated in vacuo until most of the methanol is removed. The residual suspension is extracted with chloroform, the chloroform extract is washed with dilute bicarbonate and water, dried over sodium sulfate and evaporated to dryness in vacuo. The residual crystalline material (about 200 mg.) after recrystallization from acetone-hexane furnishes pure 5α,16α,17α-trihydroxy-6β-methylpregnane-3,20-dione of the following properties: M.P. about 231–233° $[α]_D^{23}$ —1° (c, .66 in dioxane)

$λ_{max.}^{Nujol}$ 2.95, 5.89, 5.98 mμ

Analysis.—Calc'd for $C_{22}H_{34}O_5$: C, 69.81; H, 9.05. Found: C, 69.93; H, 9.02.

In a manner similar to the procedure of Example 5, 5α,16α,17α-trihydroxy-6β-ethylpregnane 3,20-bisethylene ketal is converted to 5α,16α,17α-trihydroxy-6β-ethylpregnane-3,20-dione.

EXAMPLE 6

*5α,16α,17α-trihydroxy-6β-methylpregnane-3,20-dione 16,17-acetonide*

To a solution of 100 mg. of 5α,16α,17α-trihydroxy-6β-methylpregnane-3,20-dione in 20 ml. of acetone, which has been heated to the boiling point and cooled to room temperature, is added .02 ml. of 70% perchloric acid and the mixture allowed to remain at room temperature with stirring for 2 hours. After neutralization with dilute sodium bicarbonate solution and addition of water the bulk of the acetone is removed in vacuo and the residual suspension extracted with chloroform. The chloroform extract is washed with water, dried over sodium sulfate and concentrated to dryness in vacuo. The crude crystalline residue (about 120 mg.) after recrystallization from acetone-hexane furnishes the pure acetonide of the following properties: M.P. about 270–272°; $[α]_D^{23}$+39° (c, .77 in chlf.)

$λ_{max.}^{Nujol}$ 2.91, 5.88 mμ

Analysis.—Calc'd for $C_{25}H_{38}O_5$: C, 71.74; H, 9.15. Found: C, 71.75; H, 9.18.

EXAMPLE 7

To a solution of 1 gram of 5α,16α,17α-trihydroxy-6β-methylpregnane 3,20-bisethylene ketal in 100 ml. of acetone is added .1 ml. of 70% perchloric acid and the mixture stirred at room temperature for two hours. The reaction mixture is then neutralized with dilute sodium bicarbonate, diluted with water and the bulk of the acetone removed in vacuo. The resulting precipitate is filtered, washed well with water and dried in vacuo. There is obtained about 935 mg. of the pure acetonide melting at about 260–262° (83% of theory).

EXAMPLE 8

*Acetophenone derivative of 5α,16α,17α-trihydroxy-6β-methylpregnane-3,20-dione*

To a suspension of 100 mg. of 5α,16α,17α-trihydroxy-6β-methylpregnane-3,20-dione in 2 ml. of freshly distilled acetophenone is added with stirring .01 ml. of 72% perchloric acid. The suspension clears within 7 minutes but the reaction is allowed to proceed for an additional 30 minutes. The mixture is neutralized with dilute sodium bicarbonate solution and after the addition of water extracted with chloroform. The chloroform extract is washed with water, dried over sodium sulfate and evaporated to dryness in a high vacuum to remove residual acetophenone. The crystalline residue after recrystallization from acetone-hexane has the following properties: M.P. about 138–144°;

$\lambda_{max}^{Nujol}$ 2.87, 5.86, 13.15, 14.32μ

This compound may also be obtained in polymorphic forms melting at about 190–193° or at about 260–265°.

The acetophenone derivative can also be prepared directly from 5α,16α,17α-trihydroxy-6β-methylpregnane 3,20-bisethylene ketal by using the procedure of Example 7. In this case solution is achieved prior to the addition of the perchloric acid.

In place of the acetophenone other ketones or aldehydes in both the aliphatic and aromatic series, bearing substituents such as halogen, hydroxyl, etc. can be used, as evidenced by the following examples.

EXAMPLE 9

*16α,17α-(2'-butylidene) 5α,16α,17α-trihydroxy 6β-methylpregnane-3,20-dione*

To a suspension of 100 mg. of 5α,16α,17α-trihydroxy-6β-methylpregnane-3,20-dione in 15 ml. of methylethylketone is added 0.05 ml. of 72% perchloric acid, and the mixture stirred at room temperature for two hours. The resulting solution is neutralized with sodium bicarbonated solution and after addition of water the methylethylketone is evaporated in vacuo. The resulting crystals are filtered, washed with water and dried in vacuo. Recrystallization from acetone-hexane gives the pure isobutlyidene derivative.

EXAMPLE 10

*16α,17α-(4'-methyl-2'-pentylidene) 5α,16α,17α-trihydroxy-6β-methylpregnane-3,20-dione*

To a suspension of 100 mg. of 5α,16α,17α-trihydroxy-6β-methylpregnane-3,20-dione in 15 ml. of methylisobutylketone is added 0.05 ml. of 72% perchloric acid. The mixture is stirred at room temperature for 6 hours and the resulting solution extracted with dilute sodium bicarbonate solution, washed with water, the organic phase dried over sodium sulfate and the solvent evaporated in vacuo. Recrystallization of the resulting crystals from acetone-hexane gives the pure isohexylidene derivative.

EXAMPLE 11

*16α,17α-cyclohexylidene 5α,16α,17α-trihydroxy 6β-methylpregnane-3,20-dione*

A suspension of 200 mg. of 5α,16α,17α-trihydroxy-6β-methylpregnane-3,20-dione in 15 ml. of redistilled cyclohexanone is treated for two hours as described in Example 10.

EXAMPLE 12

*16α,17α-(3'-pentylidene) 5α,16α,17α-trihydroxy-6β-methylpregnane-3,20-dione*

A suspension of 200 mg. of 5α,16α,17α-trihydroxy-6β-methylpregnane-3,20-dione in 30 ml. of diethylketone is treated for four hours as described in Example 10.

EXAMPLE 13

*16α,17α-ethylidene 5α,16α,17α-trihydroxy-6β-methylpregnane-3,20-dione*

To a suspension of 200 mg. 5α,16α,17α-trihydroxy-6β-methylpregnane-3,20-dione in 15 ml. of freshly distilled paraldehyde is added 0.05 ml. of 72% perchloric acid and the mixture agitated for 3.5 hours at room temperature. The resulting solution is extracted with dilute bicarbonate and water, dried, and the excess paraldehyde removed in vacuo. The residual material represents 16α,17α-ethyliedene 5α,16α,17α-trihydroxy - 6β - methylpregnane-3,20-dione.

EXAMPLE 14

*16α,17α-chloral derivative of 5α,16α,17α-trihydroxy-6β-methylpregnane-3,20-dione*

A suspension of 500 mg. of 5α,16α17α-trihydroxy-6β-methylpregnane-3,20-dione and 4 gm. of chloral hydrate in 20 ml. of dioxane is agitated at room temperature for 24 hours. The mixture is filtered, neutralized with aqueous sodium bicarbonate and extracted with chloroform. The chloroformdioxane phase is dried over sodium sulfate, the solvent removed in vacuo and the residual chloral deriavtive crystallized from methanol.

EXAMPLE 15

*16α,17α-(1,1,1-trifluoroisopropylidene) 5α,16α,17α-trihydroxy-6β-methylpregnane-3,20-dione*

Following the procedure of Example 14, but replacing the chloral hydrate used in that example by a mixture of 5 ml. of dioxane and 5 ml. of 1,1,1-trifluoroacetone there is obtained the trifluoroisopropylidene derivative.

EXAMPLE 16

*Benzaldehyde derivative of 5α,16α,17α-trihydroxy-6β-methylpregnane-3,20-dione*

To a suspension of 100 mg. of 5α,16α,17α-trihydroxy-6β-methylpregnane-3,20-dione in 15 ml. of benzaldehyde is added 0.05 ml. of 72% perchloric acid. The mixture is treated as in Example 14 and results in the formation of the benzaldehyde derivative of 5α,16α,17α-trihydroxy-6β-methylpregnane-3,20-dione.

EXAMPLE 17

*Furfural derivative of 5α,16α,17α-trihydroxy-6β-methylpregnane-3,20-dione*

Treatment of 5α,16α,17α-trihydroxy-6β-methylpregnane-3,20-dione with furfural in the presence of perchloric acid according to the procedure of Example 14 results in the formation of the furfural derivative of 5α,16α,17α-trihydroxy-6β-methylpregnane-3,20-dione.

EXAMPLE 18

*16α,17α-alloxan derivative of 5α,16α,17α-trihydroxy-6β-methylpregnane-3,20-dione*

A suspension of 0.5 gm. 5α,16α,17α-trihydroxy-6β-methylpregnane-3,20-dione and 2.5 gm. of alloxan in 20 ml of dioxane and 0.15 ml. of 72% perchloric acid is agitated at room temperature for 24 hours. The mixture is neutralized with aqueous sodium bicarbonate solution and after the addition of 20 ml. of water extracted with chloroform. The chloroform extract is dried over sodium sulfate and evaporated to dryness in vacuo. The residual alloxan derivative is recrystallized from 95% alcohol.

EXAMPLE 19

*Dicyclopropyl ketone derivative of 5α,16α,17α-trihydroxy-6β-methylpregnane-3,20-dione*

Following the procedure of Example 15, but replacing the trifluoroacetone by dicyclopropyl ketone, there is obtained the dicyclopropyl derivative of 5α,16α,17α-trihydroxy-6β-methylpregnane-3,20-dione.

EXAMPLE 20

*6β-methyl-16α,17α-dihydroxyprogesterone 16,17-acetonide*

To a solution of 500 mg. of 5α,16α,17α-trihydroxy-6β-methylpregnane-3,20-dione 16,17-acetonide in 100 ml. of 95% ethanol is added 5 ml. of .1 N sodium hydroxide. The mixture is allowed to stand at room temperature for 18 hours, following which it is neutralized with acetic acid, diluted with water and concentrated in vacuo. After cooling, the crystals formed are separated by filtration (about 400 mg.) dried and recrystallized from acetone-hexane. The first crop (about 215 mg.) melts at about 206–208° whereas the material obtained from the mother liquor (about 170 mg.) melts at about 180–182°. Both fractions represent polymeric modifications of 6β-methyl-16α,17α-dihydroxyprogesterone acetonide; $[\alpha]_D^{23}+87°$ (c, .99 in chlf.)

$\lambda_{max.}^{alc.}$ 241 m$\mu$ ($\epsilon$=16,000) $\lambda_{max.}^{Nujol}$ 585, 6.01 and 6.23$\mu$

*Analysis.*—Calc'd for $C_{25}H_{36}O_4$: C, 74.96; H, 9.06. Found: C, 74.88; H, 8.97.

EXAMPLE 21

To a solution of 50 mg. of 5α,16α,17α-trihydroxy-6β-methylpregnane-3,20-dione 16,17-acetonide in 2 ml. of anhydrous pyridine is added at 0° .08 ml. of freshly distilled thionyl chloride. After 3 minutes at 0° ice is added and the resulting precipitate filtered and washed well with water. The crude material (about 40 mg.) is recrystallized from acetone-hexane. After centrifuging off some dark amorphous precipitate the desired 6β-methyl-16α,17α-dihydroxyprogesterone acetonide crystallizes in fine needles melting at about 176–178°. This material proved to be identical with the one obtained in Example 20 as shown by the identity of their infrared spectra.

EXAMPLE 22

*Acetophenone derivative of 6β-methyl-16α,17α-dihydroxyprogesterone*

A solution of 100 mg. of the acetophenone derivative of 5α,16α,17α-trihydroxy-6β-methylpregnane-3,20-dione in 20 ml. of 95% alcohol and 1 ml. of .1 N sodium hydroxide is allowed to remain at room temperature overnight. The mixture is then neutralized, diluted with water and the bulk of the ethanol removed in vacuo. The resulting precipitate is filtered, washed well with water and dried in vacuo. The material is purified by chromatography on 2.8 grams of acid-washed alumina. Elution of the column with hexane-benzene 2:1 (15 ml.) and 1:1 (100 ml.) yields the pure acetophenone derivative of 6β-methyl-16α,17α-dihydroxyprogesterone of the following properties: M.P. about 144–145°; $[\alpha]_D^{23}+18.5°$ (c, .77 in chlf.)

$\lambda_{max.}^{alc.}$ 242 m$\mu$ ($\epsilon$=14,600); $\lambda_{max.}^{Nujol}$ 5.86, 6.02, 6.23, 12.95, 14.25 and 14.40$\mu$

*Analysis.*—Calc'd for $C_{30}H_{38}O_4$: C, 77.89; H, 8.28. Found: C, 77.88; H, 8.25.

By the same procedure as Examples 20, 21, and 22, the acetals and ketals prepared in Examples 9 through 19 are dehydrated to their corresponding 6β-methyl-16α,17α-dihydroxyprogesterone derivatives.

EXAMPLE 23

*6α-methyl-16α,17α-dihydroxyprogesterone 16,17-acetonide*

Into a solution of 6β-methyl-16α,17α-dihydroxyprogesterone acetonide (120 mg.) in 20 ml. of chloroform is passed at 0° a rapid stream of hydrogen chloride gas, which is followed after 30 minutes by a stream of nitrogen. The chloroform solution is washed with dilute bicarbonate and water, dried over sodium sulfate and the solvent removed in vacuo. The residual crystals (about 117 mg.) representing the 6α-methyl epimer in essentially pure form are chromatographed on 6.5 grams of acid-washed alumina. Elution of the column with mixtures of hexane-benzene, 2:1 (500 ml.) and 1:1 (250 ml.) furnishes analytically pure 6α-methyl-16α,17α-dihydroxyprogesterone 16,17-acetonide possessing the following properties: M.P. about 170–171°; $[\alpha]_D^{23}+115°$ (c, .68 in chlf.)

$\lambda_{max.}^{alc.}$ 240 m$\mu$ ($\epsilon$=16,500) $\lambda_{max.}^{Nujol}$ 5.87, 6.00 and 6.24$\mu$

*Analysis.*—Calc'd for $C_{25}H_{36}O_4$: C, 74.96; H, 9.06. Found: C, 75.02; H, 9.05.

EXAMPLE 24

*6α-methyl-16α,17α-dihydroxyprogesterone 16,17-acetonide*

(a) *Preparation of the 3-enamine derivative of 6β-methyl-16α,17α-dihydroxyprogesterone 16,17-acetonide.*—To a boiling solution of 42 mg. of 6β-methyl-16α,17α-dihydroxyprogesterone 16,17-acetonide in 1 ml. of methanol is added .1 ml. of freshly distilled pyrrolidine under a blanket of nitrogen. The solution is allowed to reflux for 3 minutes, cooled and the resulting crystals filtered and washed carefully with cold methanol. The resulting enamine derivatives (about 49 mg.) melts with decomposition at about 170–175° and has $\lambda_{max.}^{Nujol}$ 5.86, 6.14, 6.26$\mu$ (b) *Preparation of 6α-methyl-16α,17α-dihydroxyprogesterone 16,17-acetonide.*—49 g. of the 3-enamine of 6β-methyl-16α,17α-dihydroxyprogesterone 16,17-acetonide is dissolved in 3 ml. of a buffer solution made up by dissolving 40 grams of anhydrous sodium acetate, 40 ml. of acetic acid and 100 ml. of water and 500 ml. of methanol, and the resulting solution refluxed under nitrogen for 4 hours. The mixture is then diluted with water and extracted 3 times with chloroform. The chloroform extract is washed with water, dried over sodium sulfate and evaporated to dryness in vacuo. The residue (about 40 mg.) is chromatographed on 3 grams of acid-washed alumina. Elution with benzene-hexane 2:1 (250 ml.) and 1:1 (200 ml.) gives pure 6α-methyl-16α,17α-dihydroxyprogesterone acetonide (about 15.4 mg.) having a M.P. of about 169–170° and $[\alpha]_D^{23}$ +112° (in chlf.). Its infrared spectrum is identical with that of the product of Example 23.

EXAMPLE 25

*Acetophenone derivative of 6α-methyl-16α,17α-dihydroxyprogesterone*

Into a solution of 20 mg. of the acetophenone derivative of 6β-methyl-16α,17α-dihydroxyprogesterone in 20 ml. of chloroform is passed at 0° a rapid stream of hydrogen chloride gas which is followed 30 minutes later by a stream of nitrogen. The solution is then washed with dilute bicarbonate and water, dried over sodium sulfate and the solvent removed in vacuo. The residual material (about 19 mg.) is purified by chromatography on 1 gram of acid-washed alumina. Elution of the column with hexane-benzene 2:1 (30 ml.), 1:1 (60 ml.), 1:2 (50 ml.) and benzene alone furnishes the pure 6α-methyl derivative, which could not be induced to crystallization.

$\lambda_{max}^{chlf.}$ 5.86, 6.02, 6.24$\mu$

EXAMPLE 26

To a refluxing solution of 50 mg. of the acetophenone derivative of 6β-methyl-16α,17α-dihydroxyprogesterone in 1 ml. of methanol is added .1 ml. of freshly distilled pyrrolidine under a blanket of nitrogen. The mixture is refluxed for 5 minutes, following which the solvents and excess pyrrolidine are removed in vacuo. The residual enamine derivative is hydrolyzed by heating it under reflux with 3 ml. of the buffer solution described in Example 24, step *b*, under nitrogen, for 4 hours. The mixture is then diluted with water and extracted 3 times with chloroform. The chloroform extract is washed with water, dried over sodium sulfate and evaporated to dryness in vacuo. The residue on chromatography as described in Example 25 gives the pure 6α-methyl derivative.

In a similar way, following the procedure of Examples 23, 24, 25 or 26, all other acetals and ketals of 6β-methyl-16α,17α-dihydroxyprogesterone, within the purview of this invention, can be converted to their corresponding 6α-methyl-16α,17α-dihydroxyprogesterone derivatives.

The invention may be variously otherwise embodied within the scope of the appended claims.

What is claimed is:
1. A steroid of the formula

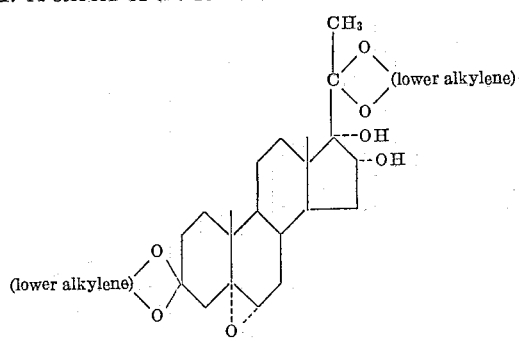

2. 5α,6α - epoxypregnane-16α,17α-diol-3,20-bisethylene ketal.
3. A steroid of the formula

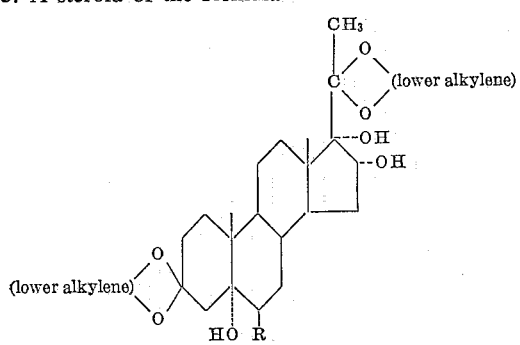

wherein R is lower alkyl.
4. 5α,16α,17α-trihydroxy-6β-methylpregnane 3,20-bisethylene ketal.
5. A steroid of the formula

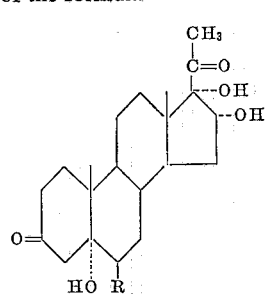

wherein R is lower alkyl.
6. 5α,16α,17α - trihydroxy - 6β - methylpregnane-3,20-dione.
7. A steroid of the formula

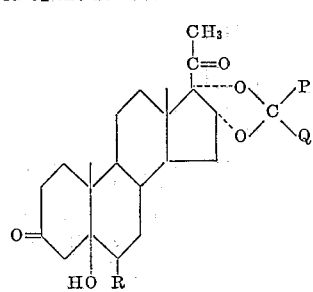

wherein R is lower alkyl; and P and Q are selected from the group consisting of hydrogen, lower alkyl, halogenated lower alkyl, monocyclic cycloalkyl, monocyclic aryl, monocyclic aryl lower alkyl, monocyclic heterocyclic, and monocyclic heterocyclic lower alkyl; and together with the carbon atom to which they are joined P and Q is selected from the group consisting of cycloalkyl and monocyclic heterocyclic.

8. A process for preparing a steroid of the formula

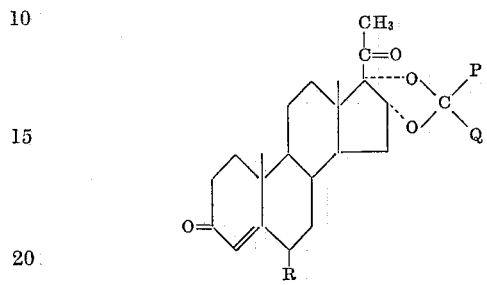

wherein R is lower alkyl; and P and Q are selected from the group consisting of hydrogen, lower alkyl, halogenated lower alkyl, monocyclic cycloalkyl, monocyclic aryl, monocyclic aryl lower alkyl, monocyclic heterocyclic, and monocyclic heterocyclic lower alkyl; and together with the carbon atom to which they are joined P and Q is selected from the group consisting of cycloalkyl and monocyclic heterocyclic, which comprises treating a steroid of the general formula

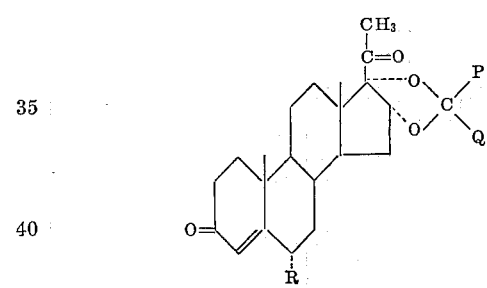

wherein R, P and Q are as above defined with a reagent selected from the group consisting of hydrogen chloride in an organic medium and pyrrolidine followed by an acetate buffer, and recovering the product formed.

9. A compound having the formula:

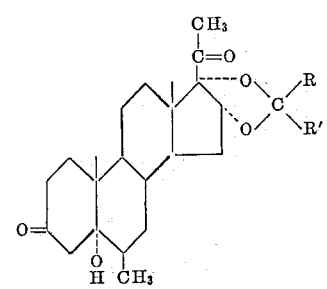

whereby R is selected from the group consisting of hydrogen and methyl and R' is selected from the group consisting of methyl and phenyl.

10. 5α,16α,17α - trihydroxy - 6β-methylpregnane-3,20-dione 16,17-acetonide.
11. 5α,16α,17α - trihydroxy - 6β-methylpregnane-3,20-dione 16,17-acetophenonide.

References Cited
UNITED STATES PATENTS

| | | | |
|---|---|---|---|
| 2,842,572 | 7/1958 | Herr et al. | 260—397.45 |
| 2,901,492 | 8/1959 | Herz et al. | 260—397.1 |
| 3,272,797 | 9/1966 | Booker et al. | |
| 3,272,798 | 9/1966 | Ellis et al. | |

(Other references on following page)

OTHER REFERENCES

Cooley et al., J. Chem. Soc. (London), December 1955, pages 4373–4376 (pages 4374 and 4376 necessary).

Cooley et al., J. Chem. Soc. (London), September 1957, pages 4112–4116.

Ackroyd et al., J. Chem. Soc. (1957), pages 4099–4105.

ELBERT L. ROBERTS, *Primary Examiner.*

LEWIS GOTTS, I. MARCUS, L. H. GASTON, M. LIEBMAN, *Examiners.*

T. J. MORGAN, M. L. WILLIAMS,
*Assistant Examiners.*